United States Patent
Anandarajah et al.

(10) Patent No.: US 11,764,431 B2
(45) Date of Patent: Sep. 19, 2023

(54) BATTERY PACK STRUCTURES AND SYSTEMS

(71) Applicant: Apple Inc., Cupertino, CA (US)

(72) Inventors: Nivay Anandarajah, San Leandro, CA (US); Evan D. Maley, Redwood City, CA (US); Alexander J. Clarabut, Santa Clara, CA (US); Yu-Hung Li, Sunnyvale, CA (US); John M. Schoech, San Jose, CA (US)

(73) Assignee: Apple Inc., Cupertino, CA (US)

( * ) Notice: Subject to any disclaimer, the term of this patent is extended or adjusted under 35 U.S.C. 154(b) by 201 days.

(21) Appl. No.: 17/077,259

(22) Filed: Oct. 22, 2020

(65) Prior Publication Data

US 2022/0131117 A1   Apr. 28, 2022

(51) Int. Cl.
  *H01M 50/20* (2021.01)
  *H01M 50/30* (2021.01)
  (Continued)

(52) U.S. Cl.
  CPC ....... *H01M 50/20* (2021.01); *H01M 10/6557* (2015.04); *H01M 50/30* (2021.01);
  (Continued)

(58) Field of Classification Search
  CPC ............. H01M 10/6557; H01M 50/20; H01M 50/204; H01M 50/209; H01M 50/287; H01M 50/30; H01M 50/358; Y02E 60/10
  See application file for complete search history.

(56) References Cited

U.S. PATENT DOCUMENTS 3,053,435 A   9/1962  Sanders et al.
6,278,259 B1  8/2001  Kimoto et al.
              (Continued)

FOREIGN PATENT DOCUMENTS

CN   2601463 Y    1/2004
CN   101326657 A  12/2008
              (Continued)

OTHER PUBLICATIONS

U.S. Appl. No. 16/259,584, "Final Office Action", dated Jun. 7, 2021, 13 pages.
(Continued)

*Primary Examiner* — Lingwen R Zeng
(74) *Attorney, Agent, or Firm* — Kilpatrick Townsend & Stockton LLP (57) ABSTRACT

Battery packs according to some embodiments of the present technology may include a longitudinal beam. The packs may include a plurality of battery cells disposed adjacent the longitudinal beam. Each battery cell may be characterized by a first surface, and a second surface opposite the first surface. Each battery cell may be characterized by a third surface extending vertically between the first surface and the second surface. The first surface may face the longitudinal beam, and battery terminals may extend from the third surface. Each battery cell may be characterized by a fourth surface opposite the third surface. The packs may include a lid coupled with the first surface of each battery cell of the plurality of battery cells. The packs may include a base coupled with the second surface of each battery cell of the plurality of battery cells.

20 Claims, 5 Drawing Sheets

(51) Int. Cl.
*H01M 10/6557* (2014.01)
*H01M 50/209* (2021.01)
*H01M 50/204* (2021.01)
*H01M 50/287* (2021.01)
*H01M 50/358* (2021.01)

(52) U.S. Cl.
CPC ........ *H01M 50/204* (2021.01); *H01M 50/209* (2021.01); *H01M 50/287* (2021.01); *H01M 50/358* (2021.01); *Y02E 60/10* (2013.01)

(56) References Cited

U.S. PATENT DOCUMENTS

| | | | |
|---|---|---|---|
| 8,956,747 | B2 | 2/2015 | Itoi et al. |
| 10,923,788 | B1 | 2/2021 | Loveness et al. |
| 11,296,380 | B2 | 4/2022 | Miler et al. |
| 11,296,381 | B2 | 4/2022 | Miler et al. |
| 11,469,471 | B1 | 10/2022 | Miler et al. |
| 2004/0069474 | A1 | 4/2004 | Wu et al. |
| 2006/0127765 | A1 | 6/2006 | Machida et al. |
| 2006/0172187 | A1 | 8/2006 | Ambrosio et al. |
| 2009/0274952 | A1 | 11/2009 | Wood et al. |
| 2009/0325054 | A1 | 12/2009 | Payne et al. |
| 2010/0055556 | A1 | 3/2010 | Meschter |
| 2010/0136391 | A1 | 6/2010 | Prilutsky et al. |
| 2010/0279152 | A1 | 11/2010 | Payne |
| 2010/0316894 | A1 | 12/2010 | Hermann et al. |
| 2011/0020676 | A1 | 1/2011 | Kurosawa |
| 2011/0097620 | A1 | 4/2011 | Kim |
| 2011/0111273 | A1 | 5/2011 | Okada et al. |
| 2011/0130049 | A1 | 6/2011 | Kaneshiro |
| 2011/0135975 | A1 | 6/2011 | Fuhr et al. |
| 2011/0195284 | A1 | 8/2011 | Yasui et al. |
| 2012/0002338 | A1 | 1/2012 | Smith et al. |
| 2012/0082880 | A1 | 4/2012 | Koetting et al. |
| 2012/0148889 | A1 | 6/2012 | Fuhr et al. |
| 2012/0194954 | A1 | 8/2012 | Fukuyama et al. |
| 2012/0231306 | A1 | 9/2012 | Herron et al. |
| 2013/0034755 | A1 | 2/2013 | Kim |
| 2013/0078488 | A1 | 3/2013 | Nemoto et al. |
| 2013/0236754 | A1 | 9/2013 | Lim |
| 2013/0295428 | A1 | 11/2013 | Hatta et al. |
| 2013/0302664 | A1 | 11/2013 | Millon |
| 2014/0023906 | A1 | 1/2014 | Hashimoto et al. |
| 2014/0162107 | A1 | 6/2014 | Obrist et al. |
| 2014/0302368 | A1 | 10/2014 | Wang et al. |
| 2014/0318106 | A1 | 10/2014 | Mizuno et al. |
| 2014/0329121 | A1 | 11/2014 | Nishihara |
| 2014/0363720 | A1 | 12/2014 | Ackermann et al. |
| 2015/0064514 | A1 | 3/2015 | Wu et al. |
| 2015/0118537 | A1 | 4/2015 | Obasih et al. |
| 2015/0194711 | A1 | 7/2015 | Rawlinson |
| 2015/0244036 | A1 | 8/2015 | Lane et al. |
| 2015/0280189 | A1 | 10/2015 | Ohshiba et al. |
| 2016/0020447 | A1 | 1/2016 | Janarthanam et al. |
| 2016/0036033 | A1 | 2/2016 | Zhang et al. |
| 2016/0093931 | A1 | 3/2016 | Rawlinson et al. |
| 2016/0099451 | A1 | 4/2016 | Murai et al. |
| 2016/0197385 | A1 | 7/2016 | Matsumoto et al. |
| 2016/0218336 | A1 | 7/2016 | Herrmann et al. |
| 2017/0162917 | A1 | 6/2017 | Yu et al. |
| 2017/0170439 | A1 | 6/2017 | Jarvis et al. |
| 2018/0138473 | A1 | 5/2018 | Bessho et al. |
| 2018/0183114 | A1 | 6/2018 | Rittner et al. |
| 2018/0294452 | A1 | 10/2018 | Tan et al. |
| 2019/0157635 | A1 | 5/2019 | Miler et al. |
| 2019/0157636 | A1* | 5/2019 | Miler .................. H01M 50/20 |
| 2019/0157729 | A1 | 5/2019 | Yamashita |
| 2019/0161909 | A1 | 5/2019 | Oikawa et al. |
| 2019/0181405 | A1* | 6/2019 | Kim .................. H01M 10/613 |
| 2019/0259996 | A1 | 8/2019 | Fritz et al. |
| 2019/0267682 | A1 | 8/2019 | Seo et al. |
| 2019/0363532 | A1 | 11/2019 | Von Zur Muehlen et al. |
| 2020/0067156 | A1 | 2/2020 | Chi et al. |
| 2020/0106075 | A1 | 4/2020 | Yanagida |
| 2020/0144576 | A1 | 5/2020 | Yoshida et al. |
| 2020/0161728 | A1* | 5/2020 | Wang .................. H01M 10/6556 |
| 2020/0220147 | A1 | 7/2020 | Haino et al. |
| 2021/0183607 | A1 | 6/2021 | Schlaak et al. |
| 2022/0111758 | A1 | 4/2022 | Ijaz et al. |
| 2022/0111759 | A1 | 4/2022 | Ijaz |
| 2022/0115897 | A1 | 4/2022 | Ijaz |
| 2023/0026549 | A1 | 1/2023 | Ijaz et al. |

FOREIGN PATENT DOCUMENTS

| | | |
|---|---|---|
| CN | 101483227 A | 7/2009 |
| CN | 101523637 A | 9/2009 |
| CN | 101627490 A | 1/2010 |
| CN | 102007619 A | 4/2011 |
| CN | 102054951 A | 5/2011 |
| CN | 103229326 A | 7/2013 |
| CN | 103579713 A | 2/2014 |
| CN | 203871442 U | 10/2014 |
| CN | 204243106 U | 4/2015 |
| CN | 105518899 A | 4/2016 |
| CN | 205177921 U | 4/2016 |
| CN | 105742535 A | 7/2016 |
| CN | 105789507 A | 7/2016 |
| CN | 208585211 U | 3/2019 |
| DE | 10049071 A1 | 4/2002 |
| DE | 102013015749 A1 | 3/2015 |
| DE | 102017118519 A1 | 2/2019 |
| EP | 1091438 A2 | 4/2001 |
| EP | 2262048 A1 | 12/2010 |
| EP | 2320493 A1 | 5/2011 |
| EP | 3346517 A1 | 7/2018 |
| JP | 2011175844 A | 9/2011 |
| JP | 2015002166 A | 1/2015 |
| WO | 2011134815 A1 | 11/2011 |
| WO | 2011134828 A1 | 11/2011 |
| WO | 2017017913 A1 | 2/2017 |
| WO | 2018022964 A1 | 2/2018 |
| WO | 2018023050 A1 | 2/2018 |
| WO | 2018207608 A1 | 11/2018 |
| WO | 2020134051 A1 | 7/2020 |
| WO | 2020134054 A1 | 7/2020 |
| WO | 2020134070 A1 | 7/2020 |
| WO | 2021088570 A1 | 5/2021 |

OTHER PUBLICATIONS

U.S. Appl. No. 15/703,114, Non-Final Office Action, dated Dec. 17, 2021, 24 pages.
U.S. Appl. No. 15/885,126, Final Office Action, dated Jan. 6, 2022, 15 pages.
U.S. Appl. No. 16/711,829, Non-Final Office Action, dated Feb. 4, 2022, 19 pages.
Application No. PCT/US2021/053553, International Search Report and Written Opinion, dated Jan. 20, 2022, 12 pages.
U.S. Appl. No. 16/263,907, "Non-Final Office Action", dated Nov. 1, 2021, 11 pages.
U.S. Appl. No. 15/794,200, "Notice of Allowance", dated Oct. 29, 2020, 8 pages.
U.S. Appl. No. 16/259,584, "Non-Final Office Action", dated Nov. 10, 2020, 16 pages.
U.S. Appl. No. 17/175,270, Non-Final Office Action, dated Mar. 17, 2022, 11 pages.
U.S. Appl. No. 16/259,440, "Notice of Allowability", dated Dec. 9, 2021, 2 pages.
U.S. Appl. No. 16/259,440, "Notice of Allowance", dated Dec. 1, 2021, 7 pages.
U.S. Appl. No. 16/259,584, "Notice of Allowance", dated Dec. 10, 2021, 12 pages.
U.S. Appl. No. 16/259,440, "Non-Final Office Action", dated Mar. 19, 2021, 12 pages.
U.S. Appl. No. 16/263,907, "Non-Final Office Action", dated Mar. 30, 2021, 12 pages.
U.S. Appl. No. 15/885,126, "Non-Final Office Action", dated Aug. 10, 2021, 15 pages.

(56) References Cited

OTHER PUBLICATIONS

China Patent Application No. 201910307710.1, "Office Action", dated Jul. 26, 2021, 17 pages.
China Patent Application No. 201910339097.1, "Office Action", dated Jun. 29, 2021, 12 pages.
U.S. Appl. No. 15/703,114, "Final Office Action", dated Mar. 16, 2020, 22 pages.
U.S. Appl. No. 15/703,114, "Non-Final Office Action", dated Aug. 22, 2019, 15 pages.
U.S. Appl. No. 15/794,200, "Non-Final Office Action", dated Mar. 19, 2020, 10 pages.
U.S. Appl. No. 15/885,126, "Final Office Action", dated Sep. 3, 2020, 14 pages.
U.S. Appl. No. 15/885,126, "Non-Final Office Action", dated Jan. 6, 2020, 20 pages.
Klambauer, et al., "cn.MOPS: Mixture of Poissons for Discovering Copy Number Variations in Next-Generation Sequencing Data with a Low False Discovery Rate", Nucleic Acids Research, vol. 40, No. 9, Feb. 1, 2012, pp. 1-14.
International Application No. PCT/US2017/044316, "International Preliminary Report on Patentability", dated Feb. 7, 2019, 7 pages.
International Application No. PCT/US2017/044316, "International Search Report and Written Opinion", dated Nov. 15, 2017, 10 pages.
International Application No. PCT/US2017/044474, "International Preliminary Report on Patentability", dated Feb. 7, 2019, 8 pages.
International Application No. PCT/US2017/044474, "International Search Report and Written Opinion", dated Oct. 24, 2017, 10 pages.
PCT/US2022/042877, "International Search Report and the Written Opinion", dated Jan. 2, 2023, 13 pages.
U.S. Appl. No. 17/318,174, Final Office Action, dated Feb. 16, 2023, 15 pages.
U.S. Appl. No. 17/448,756, Non-Final Office Action, dated Feb. 1, 2023, 23 pages.
U.S. Appl. No. 17/452,683, Non-Final Office Action, dated Mar. 21, 2023, 14 pages.
Gunther, Machine Translation of DE 102017118519 A1, 2017, 35 pages.
International Patent Application No. PCT/US2022/042873, International Search Report and Written Opinion, dated Jan. 5, 2023, 13 pages.
Zhongke et al., Machine Translation of CN 208585211 U, 2019, 28 pages.
U.S. Appl. No. 17/175,270, "Corrected Notice of Allowability", dated Oct. 13, 2022, 2 pages.
U.S. Appl. No. 17/317,849, "Non-Final Office Action", dated Oct. 6, 2022, 15 pages.
U.S. Appl. No. 17/318,174, "Non-Final Office Action", dated Oct. 14, 2022, 13 pages.
U.S. Appl. No. 17/318,182, "Non-Final Office Action", dated Oct. 6, 2022, 14 pages.
U.S. Appl. No. 17/318,188, "Non-Final Office Action", dated Oct. 6, 2022, 16 pages.
China Patent Application No. 201910307710.1, "Notice of Decision to Grant", dated Sep. 20, 2022, 6 pages.
China Patent Application No. 201910339097.1, "Office Action", dated Oct. 8, 2022, 7 pages.
U.S. Appl. No. 15/885,126, "Non-Final Office Action," dated Nov. 3, 2022, 11 pages.
U.S. Appl. No. 15/703,114, "Final Office Action", dated Aug. 11, 2022, 22 pages.
U.S. Appl. No. 15/885,126, "Advisory Action", dated Apr. 15, 2022, 4 pages.
U.S. Appl. No. 16/263,907, "Corrected Notice of Allowability", dated Sep. 9, 2022, 2 pages.
U.S. Appl. No. 16/263,907, "Notice of Allowance", dated Jun. 1, 2022, 8 pages.
U.S. Appl. No. 16/711,829, "Final Office Action", dated Jul. 28, 2022, 24 pages.
U.S. Appl. No. 17/175,270, "Notice of Allowability", dated Aug. 31, 2022, 2 pages.
U.S. Appl. No. 17/175,270, "Notice of Allowance", dated Jun. 28, 2022, 8 pages.
China Patent Application No. 201910307710.1, "Office Action", dated Mar. 2, 2022, 20 pages.
China Patent Application No. 201910339097.1, "Office Action", dated Apr. 12, 2022, 17 pages.
China Patent Application No. 201910339097.1, "Office Action", dated Jun. 24, 2022, 10 pages.

* cited by examiner

BATTERY PACK STRUCTURES AND SYSTEMS

TECHNICAL FIELD

The present technology relates to battery structures and systems. More specifically, the present technology relates to methods of configuring and coupling batteries within a pack.

BACKGROUND

Battery placement within a battery pack may be performed with many considerations. For example, battery configurations with compact placement of battery cells may provide increased energy density by allowing more battery cells within the pack. There are many thermal, structural, and mechanical challenges with the compact placement of cells.

SUMMARY

Battery packs according to some embodiments of the present technology may include a longitudinal beam. The packs may include a plurality of battery cells disposed adjacent the longitudinal beam. Each battery cell may be characterized by a first surface, and a second surface opposite the first surface. Each battery cell may be characterized by a third surface extending vertically between the first surface and the second surface. The first surface may face the longitudinal beam, and battery terminals may extend from the third surface. Each battery cell may be characterized by a fourth surface opposite the third surface. The packs may include a lid coupled with the first surface of each battery cell of the plurality of battery cells. The packs may include a base coupled with the second surface of each battery cell of the plurality of battery cells.

In some embodiments, the packs may include a lateral wall extending from the longitudinal beam between two battery cells. The plurality of battery cells may include a first set of battery cells and a second set of battery cells. The longitudinal beam may be characterized by a first longitudinal surface and a second longitudinal surface opposite the first longitudinal surface. The third surface of each battery cell of the first set of battery cells may face the first longitudinal surface of the longitudinal beam. The third surface of each battery cell of the second set of battery cells may face the second longitudinal surface of the longitudinal beam. The packs may include a first side beam positioned adjacent the fourth surface of each battery cell of the first set of battery cells. The packs may include a second side beam positioned adjacent the fourth surface of each battery cell of the second set of battery cells.

Each battery cell of the plurality of battery cells may include a vent in the fourth surface of the battery cell. A first battery cell of the plurality of battery cells may have the vent defined in the fourth surface proximate the first surface of the first battery cell. A second battery cell of the plurality of battery cells adjacent the first battery cell may have the vent defined in the fourth surface proximate the second surface of the second battery cell. A side beam adjacent the first battery cell and the second battery cell may define a first plenum and a second plenum. The first plenum may be aligned with the vent of the first battery cell. The second plenum may be aligned with the vent of the second battery cell. The base may be a heat exchanger, and the base may define fluid channels extending orthogonally to the longitudinal beam. The longitudinal beam may be or include an I-beam. The battery terminals of each battery cell of the plurality of battery cells may extend within a recess defined within along a surface of the I-beam.

Some embodiments of the present technology may encompass battery packs. The packs may include a longitudinal beam characterized by a first longitudinal surface and a second longitudinal surface opposite the first longitudinal surface. The packs may include a first side beam. The packs may include a second side beam. The packs may include a plurality of battery cells, which may include a first set of battery cells disposed between the first side beam and the first longitudinal surface of the longitudinal beam. The battery cells may include a second set of battery cells disposed between the second side beam and the second longitudinal surface of the longitudinal beam. Each battery cell of the first set of battery cells and each battery cell of the second set of battery cells may be characterized by a first surface, a second surface opposite the first surface, and a third surface extending vertically between the first surface and the second surface. The first surface may face the longitudinal beam, and battery terminals may extend from the third surface. The battery cells may also be characterized by a fourth surface opposite the third surface. The packs may include a lid coupled with the first surface of each battery cell of the plurality of battery cells. The packs may include a base coupled with the second surface of each battery cell of the plurality of battery cells.

In some embodiments, the packs may include a first lateral wall extending between the first side beam and the first surface of the longitudinal beam. The first lateral wall may extend between two battery cells of the first set of battery cells. A second lateral wall may extend between the second side beam and the second surface of the longitudinal beam. The second lateral wall may extend between two battery cells of the second set of battery cells. The base may be a heat exchanger, and the base may define fluid channels extending orthogonally to the longitudinal beam. The base may define a recess within the base, and the first lateral wall may be seated within the recess defined within the base. The packs may include an electrical interface extending through the lid and coupling with the plurality of battery cells of the battery pack. The packs may include an electronics module seated on the lid and electrically coupled with the electrical interface. the electronics module may be coupled with the first lateral wall.

Each battery cell of the plurality of battery cells may include a vent in the fourth surface of the battery cell. A first battery cell of the first set of battery cells may have the vent defined in the fourth surface proximate the first surface of the first battery cell. A second battery cell of the first set of battery cells adjacent the first battery cell may have the vent defined in the fourth surface proximate the second surface of the second battery cell. A first side beam adjacent the first set of battery cells may define a first plenum and a second plenum. The first plenum may be aligned with the vent of the first battery cell. The second plenum may be aligned with the vent of the second battery cell. The battery cells may extend within at least about 60% of a volume of the battery pack.

Some embodiments of the present technology encompass battery packs. The packs may include a longitudinal beam characterized by a first longitudinal surface and a second longitudinal surface opposite the first longitudinal surface. The packs may include a plurality of battery cells including a first set of battery cells disposed adjacent the first longitudinal surface of the longitudinal beam. The battery cells may include a second set of battery cells disposed adjacent the second longitudinal surface of the longitudinal beam.

Each battery cell of the first set of battery cells and each battery cell of the second set of battery cells may be characterized by a first surface, a second surface opposite the first surface, and a third surface extending vertically between the first surface and the second surface. The first surface may face the longitudinal beam, and battery terminals may extend from the third surface. The battery cells may be characterized by a fourth surface opposite the third surface. The packs may include a lid coupled with the first surface of each battery cell of the plurality of battery cells. The packs may include a base coupled with the second surface of each battery cell of the plurality of battery cells. The base may define a plurality of heat exchange fluid channels within the base.

Such technology may provide numerous benefits over conventional technology. For example, the present systems may increase volumetric energy density over conventional pack structures. Additionally, the present systems may have improved component structural integrity by utilizing the battery cells as part of the support structure. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Battery packs may include any number of battery cells packaged together to produce an amount of power. For example, many rechargeable batteries may include multiple cells having any number of designs including wound, stacked, prismatic, as well as other configurations. The individual cells may be coupled together in a variety of ways including series connections and parallel connections. As increased capacity is sought from smaller form factors, battery cell configurations and packaging may play an important role in operation of the battery system under normal operating conditions as well as during abuse conditions.

For example, cell damage may lead to short circuiting in some battery cell designs, which may cause temperature increases initiating exothermic reactions leading to thermal runaway. These events may generate temperatures of several hundred degrees over a period of time that may be seconds, minutes, or more depending on the size and capacity of the cell. Thermal runaway may occur when internal temperatures within a battery cell exceed a threshold temperature whether damage has occurred within the cell or not. Regardless of the initiation mechanism, once begun, the result is often continuous heat generation until reactions have consumed the cell material. When battery cells are placed within a pack design, adjacent cells may be exposed to high temperatures from neighboring cells undergoing failure events. Should this exposure occur over a sufficient time period, the internal temperature within the adjacent cell may exceed the threshold for thermal runaway, extending the failure to the adjacent cell. This process may then continue across each cell within the pack eventually consuming the majority of cells, if not every cell.

Conventional packs have attempted to control failure spread of this nature by isolating cells, incorporating extensive insulation, or increasing the separation of cells from one another. Although this may provide additional protection from cell failure spreading to adjacent cells, this may also limit capacity of a battery pack below some system requirements. Additionally, when battery packs are used in devices that may be dropped, impacted, pierced, or otherwise damaged, the battery pack and constituent cells may also be damaged, which may cause similar exothermic reactions to occur. Consequently, conventional technologies may further insulate and isolate the battery cells from a housing or structural support, which may further reduce capacity or energy density of the battery pack. The present technology overcomes these issues by creating systems that incorporate the battery cells within the structure to facilitate load distribution for many different abuse events. By incorporating the battery cells directly with the overall pack structural supports, housing and enclosure components may be reduced, which may allow increased volumetric density and specific energy for the battery pack, which may provide a more compact and robust design compared to conventional systems. Advantageously, by incorporating components in a space efficient manner, the present technology may utilize less insulation due to the inherent heat spreading of coupling the cells directly to the enclosure.

Although the remaining portions of the description will routinely reference lithium-ion or other rechargeable batteries, it will be readily understood by the skilled artisan that the technology is not so limited. The present techniques may be employed with any number of battery or energy storage devices, including other rechargeable and primary, or non-rechargeable, battery types, as well as electrochemical capacitors also known as supercapacitors or ultracapacitors. Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air-travel equipment, and space-travel equipment, as well as any other device that may use batteries or benefit from the discussed designs. Accordingly, the disclosure and claims are not to be considered limited to any particular example discussed, but can be utilized broadly with any number of devices that may exhibit some or all of the electrical or other characteristics of the discussed examples.

Figure 1:
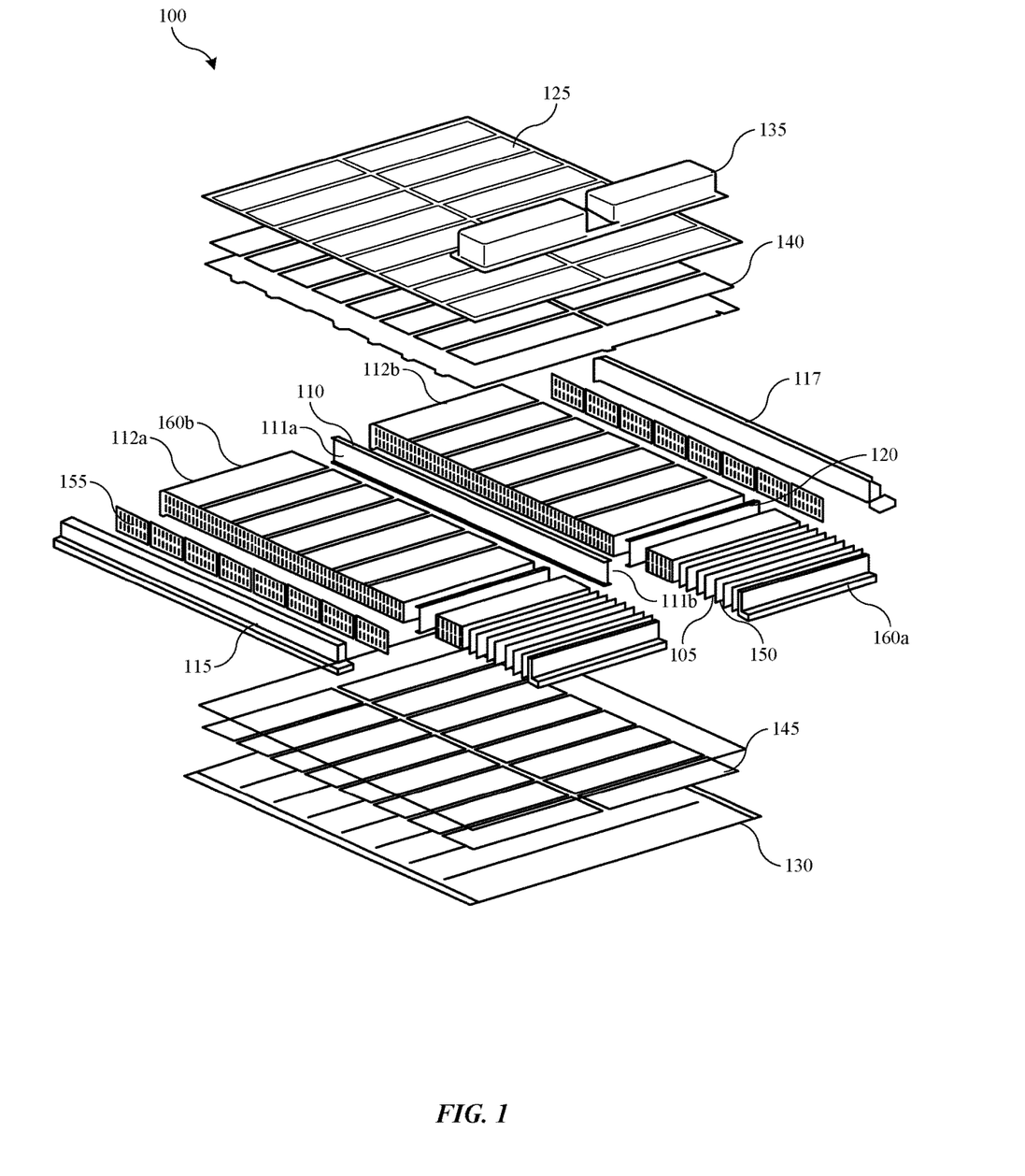
FIG. 1 shows a schematic exploded view of a battery pack according to some embodiments of the present technology.

FIG. 1 shows a schematic exploded view of a battery pack 100 according to some embodiments of the present technology. Battery pack 100 includes a number of battery cells 105 distributed in rows along either side of a longitudinal beam 110. The battery cells 105 may be separated from one another by longitudinal beam 110 into two rows extending the length of the battery pack. In some embodiments a number of longitudinal beams may be included within the battery pack where additional structural support or larger form factors are produced. The longitudinal beams may provide structural integrity to the battery pack and may provide protection for battery terminals and battery coupling as will be explained further below. As illustrated, battery pack 100 includes two sets of battery cells 105, including a first set 112a of battery cells 105, and a second set 112b of battery cells 105. As shown, first set 112a of the battery cells may extend outward from a first longitudinal surface 111a of the longitudinal beam 110, and second set 112b of the battery cells may extend outward from a second longitudinal surface 111b of the longitudinal beam 110, which may be opposite the first longitudinal surface. The battery cells 105 may be reversed in orientation between the two sets as will be described further below, and which may orient the battery terminals for all cells to be facing the longitudinal beam 110.

Along surfaces of the battery cells opposite surfaces facing the longitudinal beam may be side beams. For example, a first side beam 115 may be positioned adjacent each battery cell of the first set 112a of the battery cells, and a second side beam 117 may be positioned adjacent each battery cell of the second set 112b of the battery cells. At intervals between battery cells may be included one or more lateral walls 120, which may extend from the longitudinal beam 110 between two battery cells of each set of battery cells. Any number of lateral walls 120 may be included in battery packs according to the present technology, which may further support each set of battery cells, and provide additional structural integrity. The lateral walls may be incorporated at any interval of batteries, which may be equal or may differ across the battery pack. This may allow the lateral walls to be utilized for additional coupling as will be described below. A lid 125 may be coupled overlying the battery cells, which may be seated on a base 130. In some embodiments, lid 125 may act as a structural member providing structural attachments to a system in which the battery pack is incorporated. An electronics module 135 and power management unit may be seated on the lid, and may be coupled with the battery cells electronically as will be described further below.

As illustrated, battery packs according to some embodiments of the present technology may not include additional housing separating the battery cells from the structural supports of the battery packs. Many conventional battery packs may isolate the battery cells in modules that then may be incorporated within a structural setup for the battery pack. Because such modules may be characterized by specific geometries, the resulting battery packs may inefficiently utilize space, and may maintain a number of gaps about the structural members. The present technology may utilize alternative battery geometries and materials, which may be utilized directly with the pack structure to provide further reinforcement of the overall battery pack, as well as for the system in which the battery pack may be incorporated. For example, although battery cells encompassed by the present technology may be characterized by any dimensions, battery cells according to some embodiments of the present technology may be characterized by lateral dimensions, such as extending orthogonally to a length of longitudinal beam 110, of greater than or about 10 cm, and may be characterized by lateral dimensions greater than or about 20 cm, greater than or about 30 cm, greater than or about 40 cm, greater than or about 50 cm, greater than or about 60 cm, greater than or about 70 cm, greater than or about 80 cm, greater than or about 90 cm, greater than or about 100 cm, or more. Accordingly, each battery cell may extend from the longitudinal beam 110 to an associated side beam.

In many conventional designs, insulation may be provided along all sides of each cell block to assist in controlling heat dissipation to adjacent cells. However, because of the rapid generation of heat during failure events, the heat transferred to adjacent cells may still be sufficient to raise internal temperatures of the adjacent cells above the threshold to initiate thermal runaway in the adjacent cells as well. Because of the insulation extending around the cells, the distribution of heat to the immediately adjacent cells may be substantially uniform, and the amount of heat generated in thermal runaway may cause internal temperatures of each adjacent cell to increase above the thermal runaway threshold. Consequently, many conventional designs may be limited to less compact configurations incorporating additional and thicker insulation and module designs that incorporate more battery cell separation.

The present technology may utilize battery cells in some embodiments that may be characterized by a slower reaction during failure events, or by a lower rate of degeneration of the cell materials. For example, during a failure event, reactions consuming active materials within the cell may be controlled based on the chemical makeup of the cells to slow the reaction, which may reduce the temperature of an event. Consequently, a peak temperature during failure may be maintained below or about 1,000° C., and may be maintained below or about 900° C., below or about 800° C., below or about 700° C., below or about 600° C., below or about 500° C., below or about 400° C., or lower. This may limit impact on adjacent cells, which may otherwise be unable to survive higher temperatures that may cause thermal runaway of adjacent batteries. Accordingly, batteries may be spaced closer together, or with less insulation between adjacent batteries in some embodiments of the present technology.

By coupling the battery cells to the surrounding structural components, heat transfer from the battery cells may be further improved and less insulation may be incorporated within the pack, which may further improve volumetric energy density. For example, in some embodiments lid 125 may be coupled with a first surface of each battery cell 105 utilizing a thermal interface material 140. Thermal interface material 140 may directly contact each battery cell 105 of both sets or all sets, and may contact lid 125 on an opposite surface. Similarly, in some embodiments base 130 may be coupled with a second surface of each battery cell 105 opposite the first surface. The base 130 may be coupled with the battery cells using a thermal interface material 145. Again, thermal interface material 145 may directly contact each battery cell 105 of the battery pack, and may contact base 130 on an opposite surface. As will be described below, base 130 may be or include a heat exchanger, and thus more direct contact between the battery cells and the base may further facilitate heat transfer from battery cells during operation.

A compliant pad 150 may be positioned between each battery cell and adjacent battery cells, as well as between battery cells and lateral members in some embodiments of the present technology. As battery cells are cycled during their life, the cells may swell over time as well as during normal operation as the cell heats. When cells are rigidly compressed or contained within a particular structure, the cells may have reduced cycle life. The present technology, however, may include compliant pads or insulation configured to provide an amount of deflection or compression to accommodate swelling of battery cells over time, as well as to reduce or limit heat transfer between adjacent cell blocks. The compliant pads 150 may be configured to fully occupy space between each battery cell to limit any gaps within the structure. However, the thermal insulation material may be configured to accommodate compression of up to or about 50% or more of its thickness to accommodate battery swelling over time. Unlike conventional technology that may not provide such accommodation, the present technology may produce longer battery life cycles based on the incorporated accommodation of battery swelling within each cell block, and may accommodate cell thickness tolerance.

Between each side beam and the battery cells, a sealing foam 155 or pad may be incorporated, which may ensure complete seating of the side beam and the battery cells, and limit or prevent any gaps between the components. End beams 160a and 160b may be coupled against the battery cells at longitudinal ends of the battery pack to complete the pack structure. As illustrated, the end beams 160 may be formed in halves, or segments, which can be coupled with each set of battery cells. This may allow a battery set to be fully formed including end beams, followed by connecting with structural beams like longitudinal beams and side beams of the battery pack.

The compliant pads 150 and/or sealing foam 155 may be intended to reduce heat transfer, and may be characterized by a thermal conductivity of less than or about 0.5 W/m·K, and may be characterized by a thermal conductivity of less than or about 0.4 W/m·K, less than or about 0.3 W/m·K, less than or about 0.2 W/m·K, less than or about 0.1 W/m·K, less than or about 0.05 W/m·K, or less. The pads may be or include any number of insulative materials, and may include thermally resistive blankets, mats, and other materials that may include oxides of various metals, as well as other insulative materials that may contribute to any of the thermal conductivity numbers stated. Because of the distribution of heat away from adjacent cells, the present technology may facilitate a reduction in insulation between cells. For example, in some embodiments the amount of insulation provided between each battery cell may be less than or about 2 cm in thickness, and may be less than or about 1 cm, less than or about 8 mm, less than or about 6 mm, less than or about 5 mm, less than or about 4 mm, less than or about 3 mm, less than or about 2 mm, or less in some embodiments. The reduced insulation may contribute additional volume in a battery pack, which may be used to incorporate additional or larger battery cells, increasing overall capacity.

The thermal interface material 140 and/or thermal interface material 145 may be intended to increase heat transfer, and may be characterized by a thermal conductivity of greater than or about 0.5 W/m·K, and may be characterized by a thermal conductivity of greater than or about 1 W/m·K, greater than or about 2 W/m·K, greater than or about 5 W/m·K, greater than or about 10 W/m·K, greater than or about 25 W/m·K, or greater. The thermal interface materials may be or include any number of thermally conductive materials, and may include thermal pastes or grease, polymeric, or other conductive materials. In some embodiments the thermal interface material may not be electrically conductive, for example. In some embodiments because the surface of the cell block may not be electrically charged, an electrically conductive paste, which may also increase thermal conductivity, may be used. Additionally, material 140 and/or material 145 may be a structural adhesive in addition to or as an alternative to a thermally conductive adhesive. This may increase overall packaging efficiency within the pack. By utilizing the thermal interface materials to facilitate heat transfer away from the battery cells of the battery pack, the amount of insulation utilized may be reduced as battery cell temperature may be maintained at lower temperatures, and which again may increase the useable space within a battery pack for battery cells.

The longitudinal beams, side beams, end beams, and lateral walls, as well as the lid and/or base, may be made of any number of materials, and may act as structural members of the battery pack 100. Accordingly, the materials may be or include aluminum, steel, plastic materials, or composite materials providing some balance between strength, rigidity, and flexibility. The longitudinal beams and lateral walls may also provide an amount of heat conduction away from battery cell blocks that are in fault or other abuse conditions, including thermal runaway. The longitudinal beam and lateral walls may be I-beams in some embodiments of the present technology. While this may create recessed space along the length of the beams, this space may be used to accommodate aspects of the present technology. For example, the lateral walls may seat a compliant pad within the I-beam recess, or the recesses may be sized so a height of a battery cell may be less than a height of the I-beam, which may allow adjacent battery cells to seat within the recess to limit gaps, which may be further accommodated by a compliant pad. The lateral walls may also provide structural attachment for auxiliary systems as well as attachment to a device or system in which the pack may be incorporated.

Figure 2:
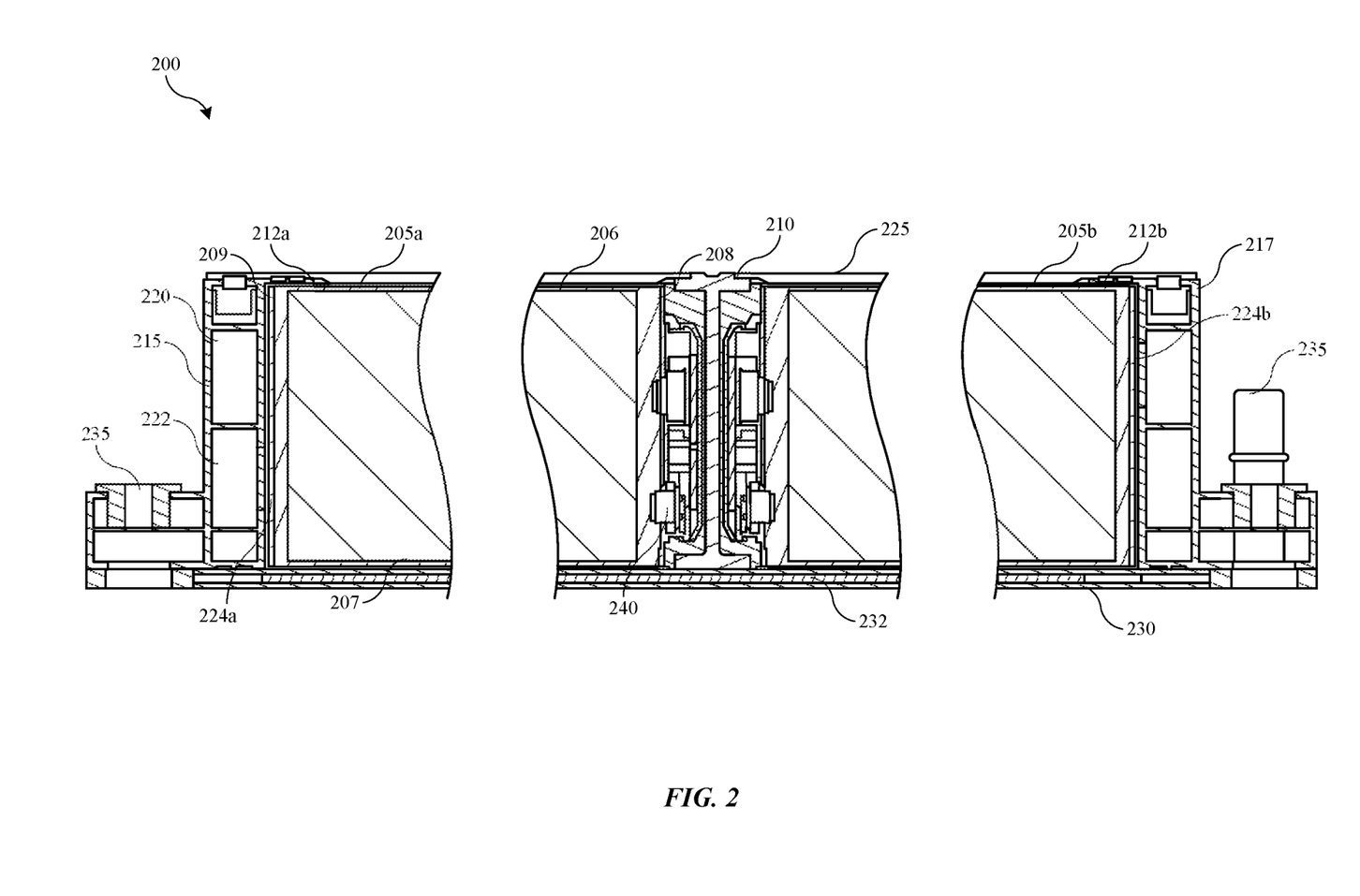
FIG. 2 shows a schematic partial cross-sectional view of a battery pack according to some embodiments of the present technology.

Similarly, longitudinal beam 110 may include a recess on each side of the beam, which may accommodate aspects of the battery cells. FIG. 2 shows a schematic partial cross-sectional view of a battery pack 200 according to some embodiments of the present technology, and may illustrate a cross-section extending laterally across the battery pack, such as from a first side beam to a second side beam as previously described. Battery pack 200 may include any feature, component, or characteristic of battery pack 100, and may illustrate additional features of battery pack 100, or other battery packs encompassed by the present technology. Battery pack 200 may illustrate fully coupled components, which may include battery cells 205 and a longitudinal beam 210 as previously described.

The battery cells 205 may be rechargeable cells, such as lithium-ion battery cells, although any battery cells or energy storage devices may be used in battery packs according to some embodiments of the present technology. The battery cells 205 may be characterized by a number of side surfaces depending on the geometry of the cells. FIG. 2 illustrates rectangular cells within battery pack 200, although other geometries and configurations are also encompassed. As illustrated, each battery cell 205 may be characterized by side surfaces in reference to the longitudinal beam 210. For example, the battery cell may be characterized by a first side surface 206 adjacent a lid of the battery pack. A thermal interface material may couple each battery cell with the lid as previously described. This may allow each cell to be included as an additional structural member of the pack. For example, unlike many conventional technologies that may fully separate the cells from surrounding structural members, the present technology may reinforce the pack further by incorporating the battery cells as structural components of the pack. Battery cell 205 may be characterized by a second side surface 207 opposite the first side surface 206. Second side surface 207 may be adjacent the base of the battery pack 200, and a thermal interface material may couple each battery cell with the base of the battery pack as previously described. Battery cell 205 may be characterized by a third side surface 208 extending vertically between the first side surface and the second side surface. Third side surface 208 of each battery cell may face the longitudinal beam 210, and thus battery cells of a first set 212a of cells and battery cells of a second set 212b of cells may be reversed in orientation so a third side of each cell for each set faces the longitudinal beam 210. Battery cell 205 may further be characterized by a fourth side surface 209 opposite the third surface 208.

Battery pack 200 may include a first side beam 215 adjacent the first set of battery cells, and may include a second side beam 217 adjacent the second set of battery cells. As illustrated, each side beam may define one or more plenums within the side beam. As one non-limiting example, side beam 215 may illustrate a first plenum 220 and a second plenum 222 defined within the side beam. Each battery cell may include a vent 224 formed in fourth surface 209 of the cell, which may allow vented effluents to be exhausted from the vent and into the plenum defined within the side beam. As will be described further below, adjacent battery cells may alternate vertical location of the vent, similar to cell 205a and cell 205b. For example, battery cell 205a may include a vent 224a formed within the fourth surface of the battery cell proximate second surface 207 as illustrated, and which may be in line with second plenum 222 formed in the side beam. Additionally, battery cell 205b may include a vent 224b formed within the fourth surface of the battery cell proximate first surface 206 as illustrated, and which may be in line with first plenum 220 formed in the side beam. By alternating vent locations between adjacent batteries, a lower heat impact may be provided to adjacent battery cells during a particular abuse event. The first plenum and the second plenum may be fluidly isolated from one another by a cross-member in the side beam as illustrated, which may further limit impact if two adjacent batteries exhaust heated effluent materials by separating the materials from one another within the side beam.

Battery pack 200 may also include a lid 225 coupled with first surfaces 206 of the battery cells as previously described, and which may operate as a structural member of the pack in addition to operating as a sealing member. Additionally, battery pack 200 may include a base 230 coupled with second surfaces 207 of the battery cells as previously described. As noted above, base 230 may be or include a heat exchanger for facilitating heat transfer from the battery cells during operation. For example, base 230 may define one or more fluid channels 232 extending orthogonally to a length of the longitudinal beam 210. Through each side beam, an inlet/outlet port 235 may extend from the base member for delivering or retrieving a heat transfer fluid that may be flowed within the channels. As will be described below, the inlet/outlet port 235 may flow the heat transfer fluid longitudinally along a flow path through the battery pack, and through fluid channels 232, which may then direct the heat transfer fluid along a flow path at the opposite side beam before retrieving the heat transfer fluid at the other inlet/outlet port.

In some embodiments of the present technology, lid 225 may also be or include a similar heat exchanger or define similar fluid channels, which may be utilized with the base heat exchanger to further improve heat transfer through the battery pack. Additionally, the lid heat exchanger when incorporated, may receive fluid from the base heat exchanger, or vice versa, and may deliver the heat transfer fluid back across the first surface of the battery cells through fluid channels defined in the lid, for example. The heat transfer fluid may be directed in an opposite direction as within the base, which may reduce a temperature gradient across the battery pack caused by flow of the fluid in a single direction through the base. Additionally or alternatively, in some embodiments a pump or delivery system for the heat transfer fluid may reverse flow at regular intervals, to limit or reduce a gradient across the battery pack.

Battery pack 200 also illustrates an embodiment where longitudinal beam 210 is an I-beam. As discussed previously, battery terminals 240 may extend from third surface 208 of each battery cell towards the longitudinal beam 210. Battery terminals may limit how flush the battery cells may be incorporated with the longitudinal beam. However, because the I-beam structure may provide recesses defined on each side of the beam, the battery terminals may be positioned within the recess, which may allow the battery cells to be more tightly packaged within the battery pack. Busbars may extend adjacent the longitudinal beam and may extend the length of the battery pack coupling each battery set in series, although parallel configurations may similarly be encompassed. The battery sets of the battery pack may then be coupled together in series to increase the voltage of the battery pack, or in parallel to increase the energy density at a set voltage. As will be described below, the electrical coupling may extend through the lid 225 or through an end of the pack.

By limiting the components and insulation of the battery pack as described, by utilizing the battery cells as part of the structural setup of the battery pack, and by reducing the tolerances between components as shown, a volumetric energy density and specific energy of the battery pack may be improved over conventional technologies by increasing the volume of the pack associated with the battery cells. For example, in some embodiments of the present technology, the battery cells may account for greater than or about 50% of the volume of the battery pack, and may account for greater than or about 55% of the volume of the battery pack, greater than or about 60% of the volume of the battery pack, greater than or about 65% of the volume of the battery pack, greater than or about 70% of the volume of the battery pack, greater than or about 75% of the volume of the battery pack, greater than or about 80% of the volume of the battery pack, or more. This may allow smaller battery packs to be utilized in electronic devices and machines, and may reduce weight associated with the battery packs.

Figure 3:
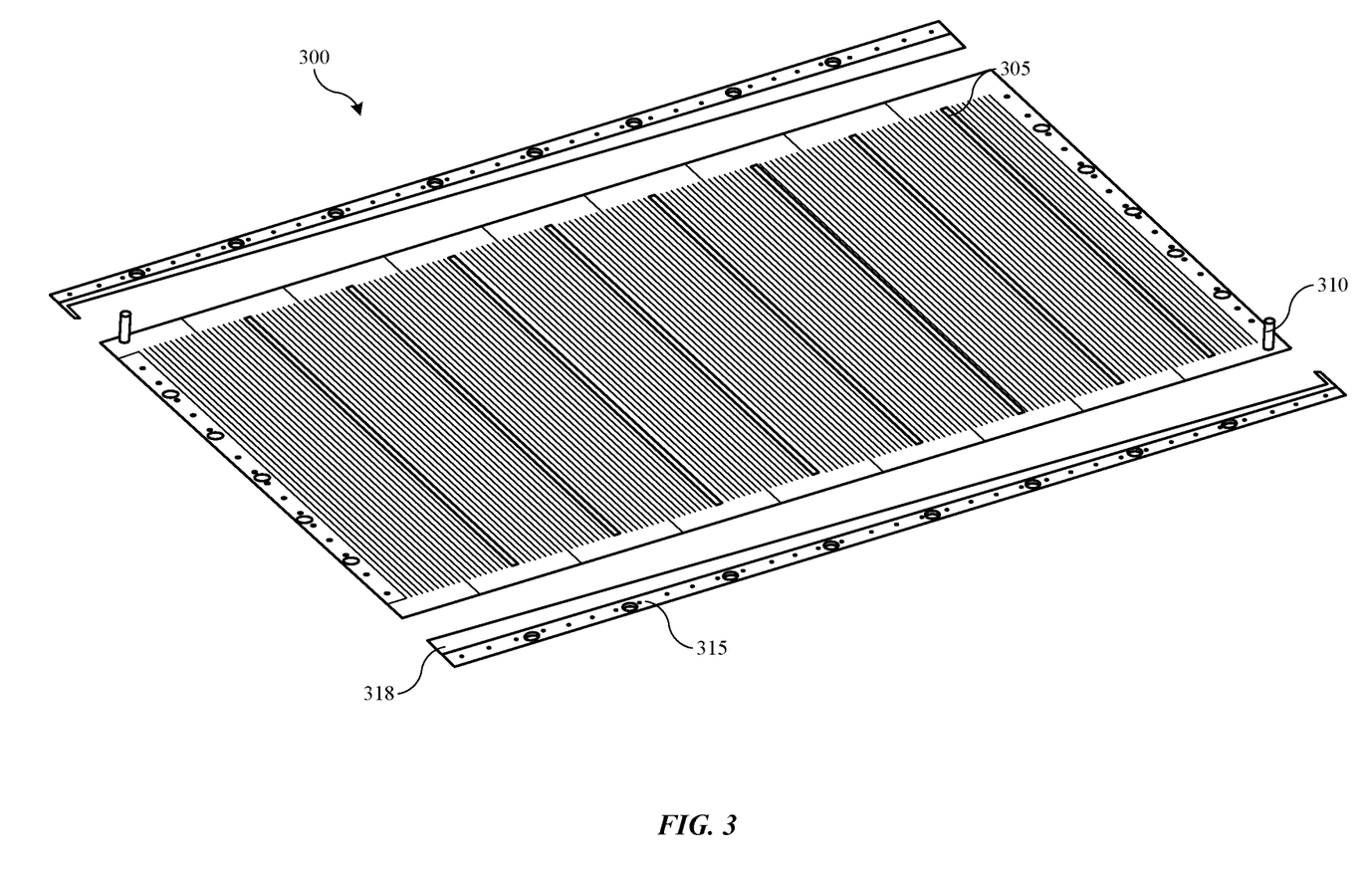
FIG. 3 shows a schematic isometric view of a base member of a battery pack according to some embodiments of the present technology.

FIG. 3 shows a schematic isometric view of a base member 300 that may be used in battery packs according to some embodiments of the present technology. Base member 300 may be included with battery packs described elsewhere in the present disclosure, and may illustrate additional features of base members according to some embodiments of the present technology. Base member 300 may include one or more sections that may be bonded, welded, or otherwise coupled together to form the base member. Each section may be extruded or otherwise formed to provide fluid channels extending across the base member. Each channel may be fluidly isolated within the base to control fluid flow within the base, and maintain a heat transfer fluid isolated from the battery cells. Among the fluid channels, the base member 300 may define one or more recesses 305. These recesses may seat the lateral walls between battery cells, which may allow the cells to seat flush against the base, or against a thermal interface material coupled between the base and each battery cell as previously described. Base member 300 may operate as both a heat exchanger as well as an external support and protective member for the battery pack based on the materials and configuration. By combining these features into a single component, further space savings may be provided.

As illustrated, base member 300 may include inlet/outlet ports 310 for delivering and retrieving the heat transfer fluid from the base member 300. A manifold 315, removed from the base member for ease of viewing, may define a channel 318 extending along the manifold, and which may deliver the heat transfer fluid along a length of the base member. As illustrated, the manifold channel 318 may increase in volume or width along the length, and the opposite manifold may have a reverse channel formed. These channels may cooperate to produce a more equal conductance of heat transfer fluid at each fluid channel through the base member along a longitude of the base member, which may facilitate more uniform heat transfer from each battery cell of the battery pack.

Figure 4:
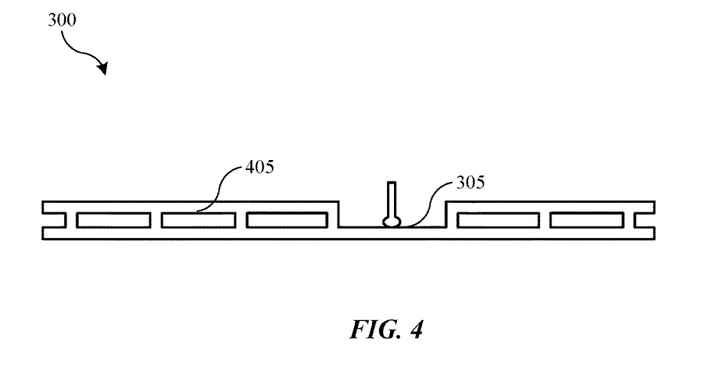
FIG. 4 shows a schematic partial cross-sectional view of a base member of a battery pack according to some embodiments of the present technology.

FIG. 4 shows a schematic partial cross-sectional view of base member 300 for use in a battery pack according to some embodiments of the present technology, and may illustrate additional features of base member 300 and fluid channels extending through the base member. As illustrated, fluid channels 405 may be formed within the base member. In some embodiments the fluid channels 405 may be formed integrally with the base member sections, which may be extruded metal. Accordingly, the channels may each be fluidly isolated from each other and from the battery cells that may be seated on the base member, or coupled with the base member with a thermal interface material. Recesses 305 as previously described may be formed between fluid channels 405. Accordingly, lateral walls may be seated within the recesses 305, while maintaining fluid isolation within the channels 405 formed within the base member. This formation of isolated channels may also increase a pressure threshold that the heat exchanger may withstand. Consequently, in some embodiments heat transfer fluids that may be used in the system may include aqueous fluids, such as may include glycol or other materials, as well as refrigerant that may be maintained under pressure within the base member and an associated refrigerant loop.

Figure 5:
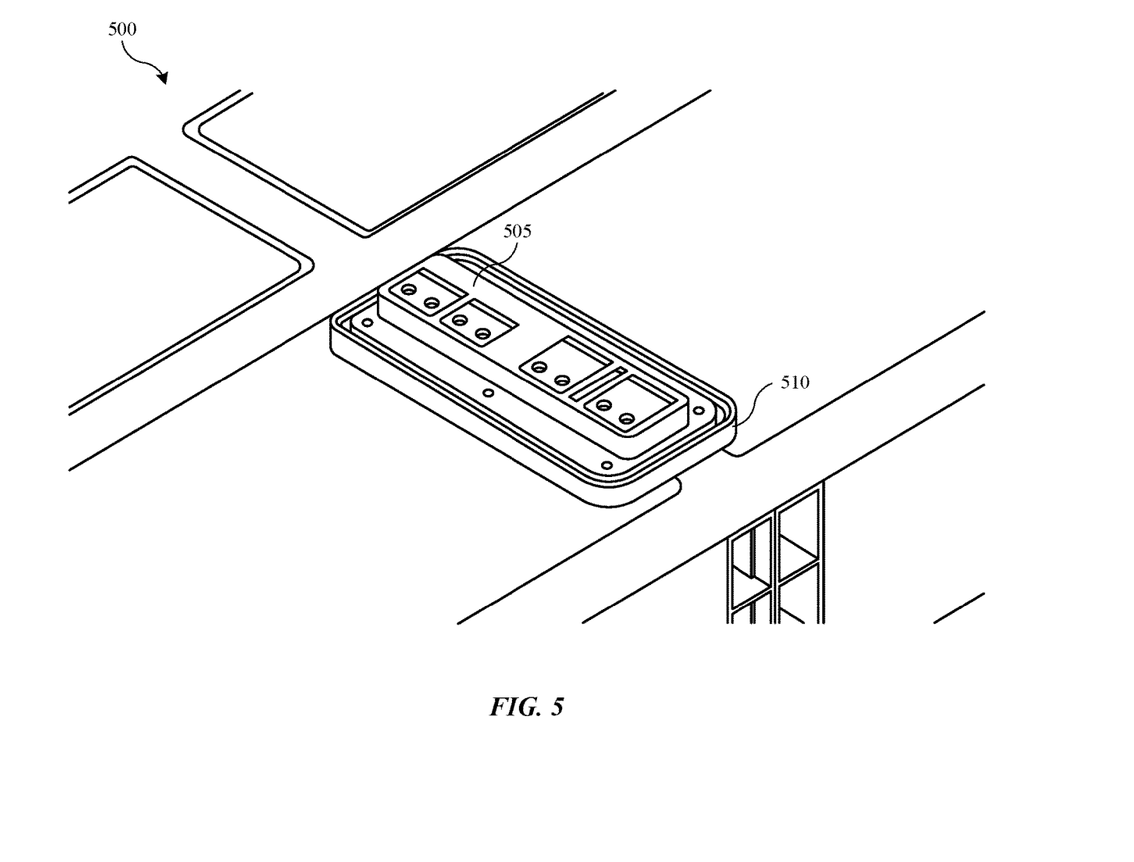
FIG. 5 shows a schematic partial view of a lid for a battery pack according to some embodiments of the present technology.

FIG. 5 shows a schematic partial view of a lid 500 for a battery pack according to some embodiments of the present technology. As described previously, a power module, or electronics module may be seated on the lid in some embodiments of the present technology. The lid may define an access through which an electrical interface 505 may extend. Electrical interface 505 may include one or more connectors providing electrical coupling for access to the battery cells. The lid may include a boss 510 projecting from the lid and extending about the electrical interface 505. The boss may include an environmental seal to limit intrusion into the pack structure. The connectors may include one or more high-voltage bus connections, which may provide electrical coupling with the individual battery cells, as well as any other power or sensor connections for the battery cells.

Figure 6:
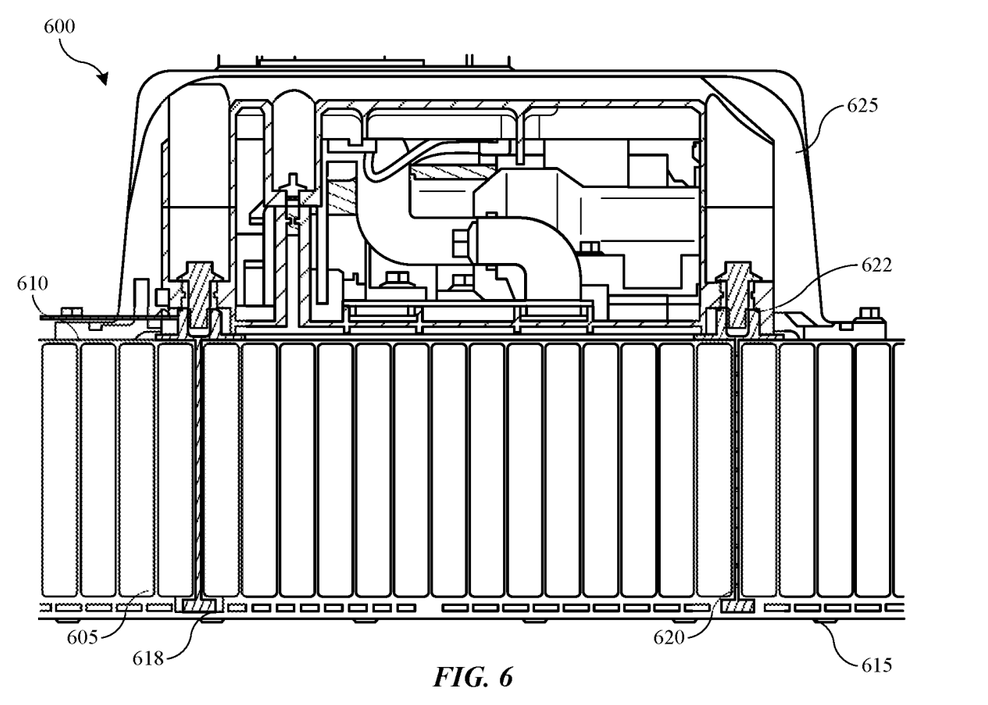
FIG. 6 shows a schematic partial cross-sectional view of a portion of a battery pack according to some embodiments of the present technology.

FIG. 6 shows a schematic partial cross-sectional view of a portion of a battery pack 600 according to some embodiments of the present technology, and may illustrate a cross-section extending longitudinally across a portion of the battery pack, such as through a number of battery cells and lateral walls. Battery pack 600 may include any feature, component, or characteristic of battery packs described previously, and may illustrate additional features of any battery pack described elsewhere, or other battery packs encompassed by the present technology. Battery pack 600 may illustrate fully coupled components, which may include battery cells 605 as previously described. Battery pack 600 may include a lid 610, which may be coupled with a first surface of the battery cells as previously described. Similarly, battery pack 600 may include a base 615, which may define a plurality of fluid channels for delivering a heat exchange fluid as discussed above.

Battery pack 600 may include one or more lateral walls 620 as previously described, which may extend at intervals between battery cells. As discussed above, lateral walls 620 may seat within the base 615 at recesses 618, which may allow battery cells 605 to be disposed in closer contact with the base member or a thermal interface material coupling the battery cells with the base. Some lateral walls 620 may also include an interface 622 or receptacle that may extend through lid 610 as illustrated. The interfaces may allow mechanical coupling of components, such as an electronics module 625. The interfaces may further be used to couple the battery pack within a surrounding structure, which may further improve pack stiffness and reinforcement. As illustrated, the electronics module may be seated on the lid of the battery pack, and may couple with connectors extending through the lid as previously described. To limit movement of the electronics module, the module may be coupled with the lateral walls utilizing the interfaces 622. The electronics module may include electrical connections with the battery cells, and may include additional monitoring, sensing, and control components associated with the battery pack operation.

Figure 7:
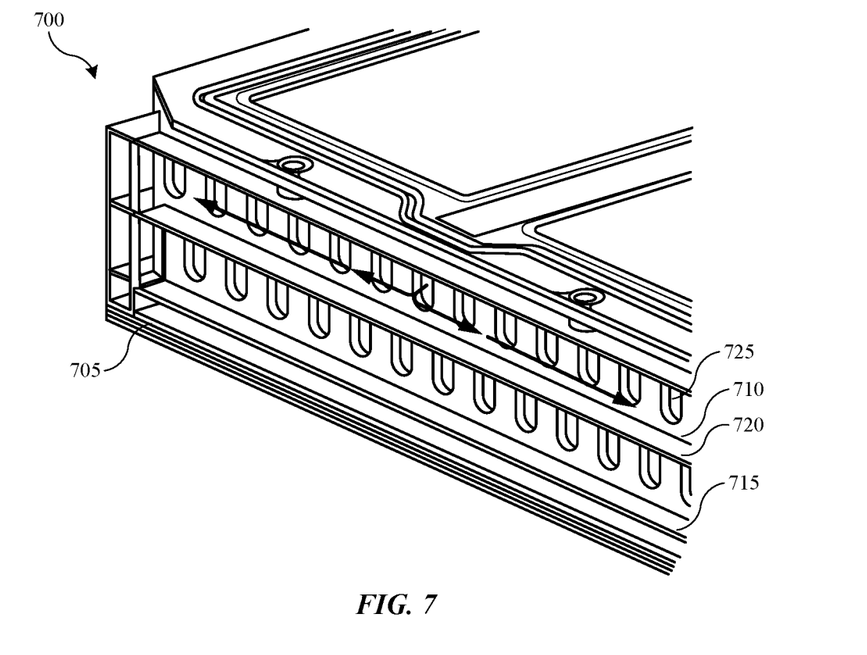
FIG. 7 shows a schematic partial sectional view through a side beam of a battery pack according to some embodiments of the present technology.

FIG. 7 shows a schematic partial sectional view through a side beam of a battery pack 700 according to some embodiments of the present technology, and may illustrate a cross-section extending longitudinally across a portion of the battery pack, such as along a side beam. Battery pack 700 may include any feature, component, or characteristic of battery packs described previously, and may illustrate additional features of any battery pack described elsewhere, or other battery packs encompassed by the present technology. Battery pack 700 may illustrate additional features of a plenum structure formed within the side beams according to some embodiments. For example, side beam 705 may define a first plenum 710 and a second plenum 715, which may be fluidly separated along the side beam with a divider 720. The plenums may be formed adjacent vents of the battery cells. As noted previously, each battery cell may have the vent formed at an alternating location from adjacent battery cells. For example, while a first battery cell includes a vent near the lid, which may exhaust into the first plenum 710, an adjacent battery cell may include a vent near the base, which may exhaust into the second plenum 715. These separate venting plenums may limit interaction of effluent materials with adjacent batteries. The plenums may extend to a pack vent located at an end beam or integrated into a side beam, which may allow any effluent materials to leave the battery pack. By utilizing structural components and configurations according to embodiments of the present technology, battery packs may be produced having improved structural integrity, while limiting increases in volume due to additional packaging and insulation materials.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery pack comprising:
a longitudinal beam having an I-shaped cross-section defining first and second recessed regions along opposite sides of the beam;
a plurality of battery cells positioned adjacent the longitudinal beam, wherein each battery cell is characterized by:
a first surface,
a second surface opposite the first surface,
a third surface extending vertically between the first surface and the second surface, wherein:
the third surface faces the first recessed region of the longitudinal beam; and
battery terminals extend from the third surface; and
a fourth surface opposite the third surface;
a lid coupled with the first surface of each battery cell of the plurality of battery cells; and
a base coupled with the second surface of each battery cell of the plurality of battery cells.

2. The battery pack of claim 1, further comprising:
a lateral wall extending from the longitudinal beam between two battery cells.

3. The battery pack of claim 1, wherein the plurality of battery cells comprise a first set of battery cells and a second set of battery cells, wherein the longitudinal beam is characterized by a first longitudinal surface and a second longitudinal surface opposite the first longitudinal surface, wherein the third surface of each battery cell of the first set of battery cells faces the first longitudinal surface of the longitudinal beam, and wherein the third surface of each battery cell of the second set of battery cells faces the second longitudinal surface of the longitudinal beam.

4. The battery pack of claim 3, further comprising:
a first side beam positioned adjacent the fourth surface of each battery cell of the first set of battery cells; and
a second side beam positioned adjacent the fourth surface of each battery cell of the second set of battery cells.

5. The battery pack of claim 1, wherein each battery cell of the plurality of battery cells comprises a vent in the fourth surface of the battery cell.

6. The battery pack of claim 5, wherein a first battery cell of the plurality of battery cells has the vent defined in the fourth surface proximate the first surface of the first battery cell, and wherein a second battery cell of the plurality of battery cells adjacent the first battery cell has the vent defined in the fourth surface proximate the second surface of the second battery cell.

7. The battery pack of claim 6, wherein a side beam adjacent the first battery cell and the second battery cell defines a first plenum and a second plenum, wherein the first plenum is aligned with the vent of the first battery cell, and wherein the second plenum is aligned with the vent of the second battery cell.

8. The battery pack of claim 1, wherein the base is a heat exchanger, and wherein the base defines fluid channels extending orthogonally to the longitudinal beam.

9. The battery pack of claim 1, wherein the battery terminals of each battery cell of the plurality of battery cells extend within one of the first or second recessed regions of the longitudinal beam.

10. A battery pack comprising:
a longitudinal beam characterized by a first longitudinal surface and a second longitudinal surface opposite the first longitudinal surface, wherein the longitudinal beam has an I-shaped cross-section defining first and second recessed regions along opposite sides of the beam;
a first side beam;
a second side beam;
a plurality of battery cells comprising:
a first set of battery cells disposed between the first side beam and the first longitudinal surface of the longitudinal beam;
a second set of battery cells disposed between the second side beam and the second longitudinal surface of the longitudinal beam, wherein each battery cell of the first set of battery cells and each battery cell of the second set of battery cells is characterized by:
- a first surface,
- a second surface opposite the first surface,
- a third surface extending vertically between the first surface and the second surface, wherein:
  - the third surface faces the first recessed region of the longitudinal beam, and
  - battery terminals extend from the third surface; and
- a fourth surface opposite the third surface;
- a lid coupled with the first surface of each battery cell of the plurality of battery cells; and
- a base coupled with the second surface of each battery cell of the plurality of battery cells.

11. The battery pack of claim 10, further comprising:
- a first lateral wall extending between the first side beam and the first surface of the longitudinal beam, wherein the first lateral wall extends between two battery cells of the first set of battery cells; and
- a second lateral wall extending between the second side beam and the second surface of the longitudinal beam, wherein the second lateral wall extends between two battery cells of the second set of battery cells.

12. The battery pack of claim 11, wherein the base is a heat exchanger, and wherein the base defines fluid channels extending orthogonally to the longitudinal beam.

13. The battery pack of claim 12, wherein the base defines a recess within the base, and wherein the first lateral wall is seated within the recess defined within the base.

14. The battery pack of claim 11, further comprising:
- an electrical interface extending through the lid and coupling with the plurality of battery cells of the battery pack.

15. The battery pack of claim 14, further comprising:
- an electronics module seated on the lid and electrically coupled with the electrical interface, wherein the electronics module is coupled with the first lateral wall.

16. The battery pack of claim 10, wherein each battery cell of the plurality of battery cells comprises a vent in the fourth surface of the battery cell.

17. The battery pack of claim 16, wherein a first battery cell of the first set of battery cells has the vent defined in the fourth surface proximate the first surface of the first battery cell, and wherein a second battery cell of the first set of battery cells adjacent the first battery cell has the vent defined in the fourth surface proximate the second surface of the second battery cell.

18. The battery pack of claim 17, wherein a first side beam adjacent the first set of battery cells defines a first plenum and a second plenum, wherein the first plenum is aligned with the vent of the first battery cell, and wherein the second plenum is aligned with the vent of the second battery cell.

19. The battery pack of claim 10, wherein the battery cells comprise at least about 60% of a volume of the battery pack.

20. A battery pack comprising:
- a longitudinal beam characterized by a first longitudinal surface and a second longitudinal surface opposite the first longitudinal surface, wherein the longitudinal beam has an I-shaped cross-section defining first and second recessed regions along opposite sides of the beam;
- a plurality of battery cells comprising:
  - a first set of battery cells disposed adjacent the first longitudinal surface of the longitudinal beam;
  - a second set of battery cells disposed adjacent the second longitudinal surface of the longitudinal beam, wherein each battery cell of the first set of battery cells and each battery cell of the second set of battery cells is characterized by:
    - a first surface,
    - a second surface opposite the first surface,
    - a third surface extending vertically between the first surface and the second surface, wherein:
      - the third surface faces the first recessed region of the longitudinal beam, and
      - battery terminals extend from the third surface; and
    - a fourth surface opposite the third surface;
- a lid coupled with the first surface of each battery cell of the plurality of battery cells; and
- a base coupled with the second surface of each battery cell of the plurality of battery cells, wherein the base defines a plurality of heat exchange fluid channels within the base.

* * * * *